: 3,338,940
HEXAFLUORO-ARSENIC AND -PHOSPHORIC ACID SALTS OF THREONINES

Hugh T. Harrison, Tulsa, Okla., assignor to The Dow Chemical Company, Midland, Mich., a corporation of Delaware
No Drawing. Filed May 8, 1964, Ser. No. 366,167
4 Claims. (Cl. 260—440)

The present invention is directed to organic chemistry and is particularly directed to the novel salts of, on the one hand, threonine and, on the other hand, hexafluoroarsenic or hexafluorophosphoric acid. The compound threonine is also known as 2-amino-3-hydroxybutyric acid.

The present compounds are crystalline solid materials, of low solubility in organic solvents and of low to moderate solubility in water. They are useful as parasiticides for the control of a number of mite, insect, bacterial, fungal, and helminth organisms, such as intestinal roundworms, lone star tick, southern army worm, two-spotted spider mite, Aspergillus terreus and Rhizopus nigricans.

The novel compounds are prepared by reacting threonine with hexafluoroarsenic or hexafluorophosphoric acid. Conveniently, the reaction is carried out in an inert liquid reaction medium, such as water. The reaction is exothermic and takes place smoothly at temperatures of from −10° to 80° C.; conveniently, the reaction is conducted at room temperature. Good results are obtained when substantially equimolecular amounts of the reagents are employed.

The hexafluoroarsenic or hexafluorophosphoric acid reactant is usually employed as a liquid, conveniently, the commercial product which contains 65 percent $HAsF_6$, 21 percent $H_2O$, and 14 percent related arsenic acids, or the commercial product which contains 65 percent $HPF_6$, 21 percent $H_2O$ and 14 percent related phosphorus acids. In other procedures, a liquid containing one of the acids is prepared in the manner of Nuttall et al. in their preparation of an aqueous solution of hexafluorophosphoric acid. See the Journal of the Chemical Society (London), 1960, pages 4965–4970. In yet other procedures, it is sometimes convenient to employ a solid hydrate form of one of the acids.

The threonine reactant can be employed as either of its two enantiomorphic forms D and L, or as a mixture of the two forms. Because of the commercial availability of the mixture, which is spoken of as DL-threonine, it is convenient and preferred to employ DL-threonine to make the DL-threonine salts according to the present invention. These DL-threonine salts constitute a preferred group according to the present invention.

In carrying out the reaction, the threonine is contacted with one of the acids in any conventional manner, conveniently, by adding one reactant to the other reactant. The temperature of the resulting reaction mixture can be controlled by regulating the rate of the contacting of the reactants as well as by external cooling. Upon completion of the contacting of the reactants, most of the reaction will have taken place with the production of the desired product. Where optimum yields are desired, it is often convenient that the reaction mixture be allowed to stand for several hours or longer. Upon completion of the reaction, solvent employed as inert liquid reaction medium can be removed from the reaction mixture by evaporation or distillation under subatmospheric pressure to obtain the salt product as a residue. This product residue can be further purified by conventional procedures such as washing with water or suitable organic liquid and recrystallization.

Example 1.—DL-threonine hexafluoroarsenate 300 grams of hexafluoroarsenic acid hexadydrate (about 1.0 mole) are dispersed in 100 milliliters of water and 120 grams of DL threonine (about 1.0 mole) added to the resulting dispersion at room temperature. The resulting reaction mixture is permitted to stand for a period of several hours at room temperature to complete the reaction. Thereafter, inert liquid reaction medium is removed from the reaction mixture to obtain a concentrated reaction mixture. The concentrated reaction mixture is filtered to separate the DL-threonine hexafluoroarsenate product as a residue and traces of inert liquid reaction medium removed from the product residue by evaporation under subatmospheric pressure in the presence of a dehydrating agent. The product is found to be a white solid material melting, with decomposition, at 200–205° C.

In a similar procedure, there are prepared a DL-threonine hexafluorophosphate product melting at 117–119° C., with decomposition; a D-threonine hexafluoroarsenate product having a molecular weight of 309.1; and an L-threonine hexafluorophosphate product having a molecular weight of 265.1.

When one of the present compounds is employed as a parasiticide, the unmodified compound can be employed. However, the present invention also encompasses the use of a compound of the present invention together with a parasiticide adjuvant. In such use, the compound can be dispersed upon a finely divided solid and the resulting preparation employed as a dust. Also, such a preparation can be dispersed in water with the aid of a wetting agent and the resulting aqueous suspension employed as a spray. In other procedures, a product according to the present invention can be employed as a constituent of organic liquid compositions, oil-in-water or water-in-oil emulsions, or water dispersions, with or without the addition of wetting, dispersing, or emulsifying agents. In representative operations, DL-threonine hexafluorophosphate gives 100 percent control of the growth of Aspergillus terreus in nutrient agar growth medium having incorporated therein the compound in the amount of 0.05 percent.

The threonine compound to be employed as a reactant according to the teachings of the present invention is itself prepared in known procedures. The initial product of such procedures is the mixture, containing about equal portions of the D and L forms, which mixture is known as DL-threonine. When it is desired to employ only one of the two forms, the DL mixture is separated into its component portions. For a discussion of the preparation and separation procedures, see the Kirk Othmer Encyclopedia of Chemical Technology (Interscience Publishers, New York), second Edition, 1963, volume 2, pages 156–197.

I claim:
1. A salt of threonine and a member selected from the group consisting of hexafluoroarsenic and hexafluorophosphoric acid.
2. DL-threonine hexafluoroarsenate.
3. DL-threonine hexafluorophosphate.
4. D-threonine hexafluoroarsenate.

References Cited
UNITED STATES PATENTS
3,152,160   10/1964   Harrison _____ 260—440

TOBIAS E. LEVOW, Primary Examiner.
W. F. W. BELLAMY, Assistant Examiner.